(12) United States Patent
Strobel

(10) Patent No.: US 7,934,728 B2
(45) Date of Patent: May 3, 2011

(54) SWIVEL AND STOP-LIMIT FEATURE ON WHEELBARROWS FOR AUTOMATIC LOAD ADJUSTMENT

(75) Inventor: Guye Strobel, Winnipeg (CA)

(73) Assignee: Allbarrow International LLC, Charlestown, Nevis (KN)

( * ) Notice: Subject to any disclaimer, the term of this patent is extended or adjusted under 35 U.S.C. 154(b) by 260 days.

(21) Appl. No.: 12/149,289

(22) Filed: Apr. 30, 2008

(65) Prior Publication Data

US 2008/0277889 A1 Nov. 13, 2008

Related U.S. Application Data

(63) Continuation of application No. 11/160,606, filed on Jun. 30, 2005, now abandoned.

(51) Int. Cl.
*B62B 1/20* (2006.01)
(52) U.S. Cl. .................................... 280/47.21; 280/654
(58) Field of Classification Search .................. 280/63, 280/64, 65, 47.17, 47.18, 47.21, 47.22, 47.24, 280/47.3, 47.31, 652, 653, 654, 645
See application file for complete search history.

(56) References Cited

U.S. PATENT DOCUMENTS

| | | | |
|---|---|---|---|
| 469,265 A | 2/1892 | Otto | |
| 2,800,335 A * | 7/1957 | Clapp | 280/42 |
| 2,852,304 A | 9/1958 | Harrison | |
| 3,565,453 A * | 2/1971 | Del Raso et al. | 280/38 |
| 4,854,601 A | 8/1989 | Herndon | |
| 4,955,625 A * | 9/1990 | Herndon | 280/47.31 |
| 5,087,061 A | 2/1992 | Wallace | |
| 5,758,887 A * | 6/1998 | Bobst | 280/47.31 |
| 5,924,708 A * | 7/1999 | Bisaillon et al. | 280/47.26 |
| 6,886,838 B1 | 5/2005 | Zimmerman | |
| 7,398,980 B2 * | 7/2008 | Capers et al. | 280/47.31 |
| 2002/0113389 A1 | 8/2002 | Robinson | |
| 2005/0104334 A1* | 5/2005 | Conaway et al. | 280/653 |

FOREIGN PATENT DOCUMENTS

| | | |
|---|---|---|
| CA | 2169578 | 8/1997 |
| CA | 2 404 372 | 3/2004 |
| FR | 2 694 914 | 2/1994 |
| JP | 11020703 | 1/1999 |

* cited by examiner

*Primary Examiner* — J. Allen Shriver, II
*Assistant Examiner* — John D Walters
(74) *Attorney, Agent, or Firm* — Dennison, Schultz & MacDonald

(57) ABSTRACT

A wheelbarrow having two wheels mounted on an axis which is allowed to swivel, thereby allowing the axle to tilt with the terrain while the tray and handles remain substantially level. The wheel assembly is coupled to stop-limits to prevent the excessive tilting of the wheels with respect to the tray and handles.

26 Claims, 7 Drawing Sheets

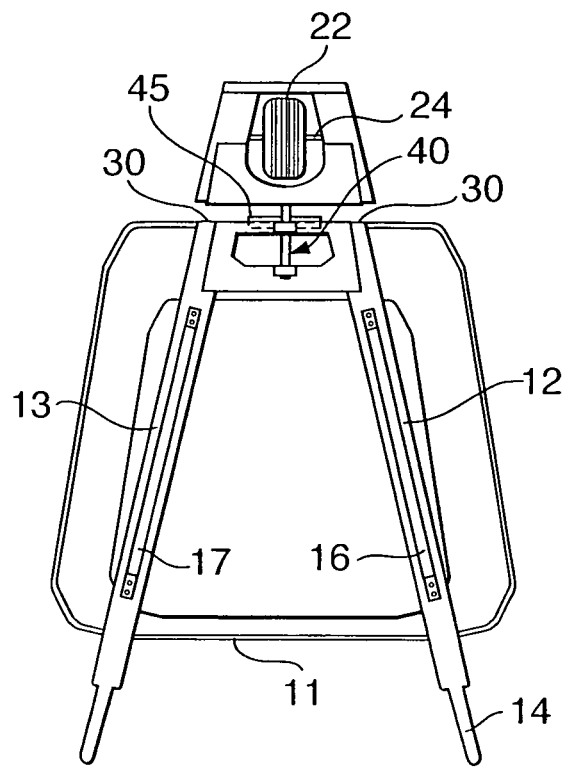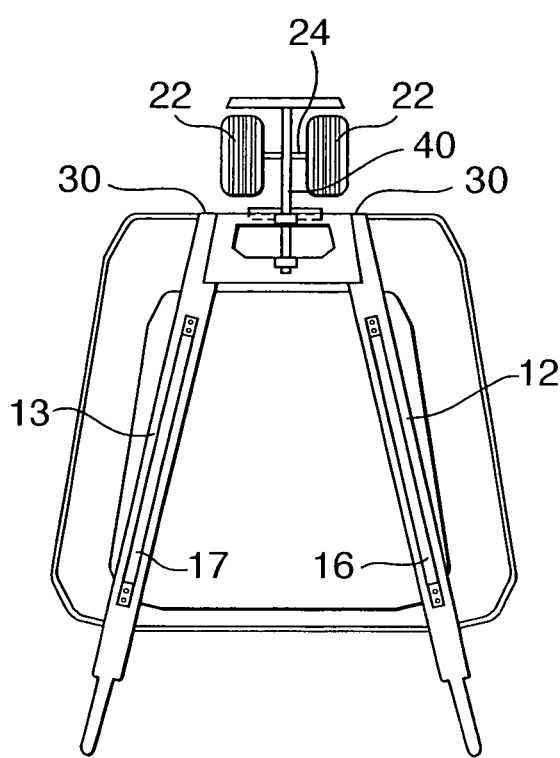
FIG. 3          FIG. 4
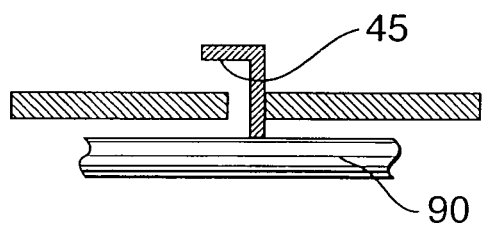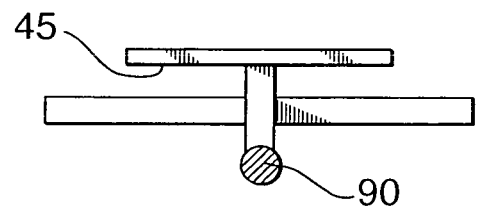
FIG. 5          FIG. 6

SWIVEL AND STOP-LIMIT FEATURE ON WHEELBARROWS FOR AUTOMATIC LOAD ADJUSTMENT

This application is a continuation-in-part of application Ser. No. 11/160,606, filed Jun. 30, 2005, now abandoned.

FIELD OF THE INVENTION

The present invention relates generally to wheelbarrows. Specifically, the present invention provides a wheelbarrow having a wheel assembly comprising a swivel to allow the wheelbarrow to be more easily moved across uneven terrain.

BACKGROUND OF THE INVENTION

Wheelbarrows are an important tool used at home and work to support manual labor. The conventional wheelbarrow has a tray mounted on two handlebars forming an undercarriage that provide a supporting bridge between the wheel and the handgrips at the ends of the handlebars held by the operator. The conventional design, using one wheel, allows the barrow to pivot around the point defined by where the wheel meets the ground. In this conventional design, tilting of the terrain is not transferred to the handlebars and tray, thereby eliminating torque transfer to the operator due to uneven terrain. However, under conditions of load shifting, conventional wheelbarrows have the disadvantage that full torque is applied to the grips thereby burdening the operator.

Recently, conventional wheelbarrows have been widely marketed in a modified version using two spaced apart side by side wheels instead of only one as in the original design. The multiple wheels benefit the conventional design by making it more stable and less likely to tip sideways due to uneven loading. This is achieved by creating two pivot points off the center axis of the load thereby applying countertorque against the tipping. Unfortunately for this modification, this also means that unevenness in the terrain is transferred to the grips—unevenly between each of them. This is awkward for the operator in only mildly undulating terrain, becoming very difficult and disconcerting as the terrain becomes more uneven. The operator must constantly adjust his/her posture or suffer the load being transferred to one arm or the other in an often drastic manner.

SUMMARY OF THE INVENTION

This invention aims to improve on the prior art designs by providing a multiple-wheel wheelbarrow, whereby the wheel assembly is adapted to tilt with the terrain while allowing the tray and handles to remain reasonably level for the operator. The wheelbarrow, according to another preferred aspect of the present invention, further comprises stop-limits to prevent tipping in extreme cases of load shifting.

This invention is a swivel point with stop-limits between the wheel assembly and the tray/handle assembly as on the conventional wheelbarrow. The swivel point allows the tray and handle to rotate independent of the wheel(s). The axis of rotation is closely horizontal with the ground. This axis also closely intersects the center of the wheel (vertically and horizontally) and the center of the axis defined by the line through both handle grips used by the operator.

In order to reestablish the stability offered by a wide wheelbase, that is lost due to the swivel feature, stop-limit points are implemented into the swivel mechanism. Up to the stop-limit, any torque introduced as the load shifts is transferred to either grip. However, beyond the stop-limit, torque is transferred directly to the wheel assembly thereby reestablishing the underlying stability advantage of the wider wheel-base design. This stop-limit could be graduated, designed to transfer more of the torque onto the wheels the further the tray rotates, or it could be fixed—100% on the operator up to the stop-limit then 100% on the wheel assembly beyond the stop-limit. These features combined, gives the barrow the freedom to adjust as offered by the single wheeled barrow with the stability offered by a wide wheelbase.

The conventional design need not be significantly modified to implement this invention. Existing wheelbarrows could be retrofitted with the invention as part of a harness unit comprising assembly braces, blocks, and swivel axle along with necessary components to make these elements work together.

According to the present invention then, there is provided a wheelbarrow comprising a tray for carrying a load; a pair of coplanar handlebars connected to the tray to support the same; a pair of spaced apart ground engaging rotatable wheels; and swivel means connecting said pair of spaced apart wheels to said handlebars wherein said wheels can pivot relative to said tray.

BRIEF DESCRIPTION OF THE DRAWINGS

Preferred embodiments of the present invention will now be described in greater detail and will be better understood when read in conjunction with the following drawings in which:

FIG. 3 is a schematical plan view of the wheelbarrow of FIG. 2 in a single wheeled version;

FIG. 4 is a schematical plan view of the wheelbarrow of FIG. 2 in a multi-wheeled version;

FIG. 5 is a schematical side view of a rotation limiter forming part of the wheelbarrow of FIG. 2;

FIG. 6 is a schematical front elevational view of the rotation limiter of FIG. 5;

DETAILED DESCRIPTION OF THE DRAWINGS

Figure 1:
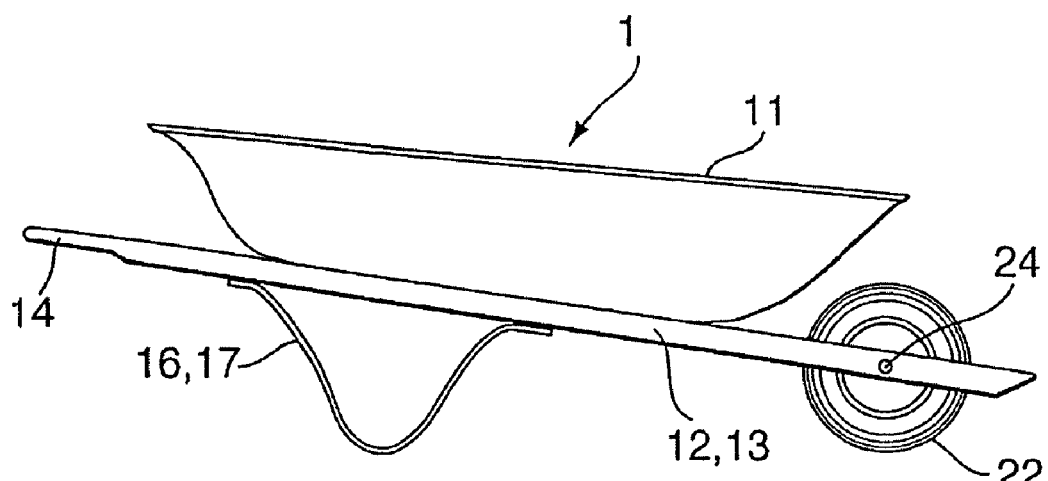
FIG. 1 is a side elevational view of a conventional one or two wheeled wheelbarrow in accordance with the prior art.

FIG. 1 shows a conventional wheelbarrow 1 having a tray 11 for the load, handlebars 12 and 13 which are connected to and support the tray, ground engaging legs 16 and 17, and one or more ground engaging wheels 22 freely rotatable about an axle 24 which is rigidly connected to handlebars 12 and 13 forwardly of tray 11. Handlebars 12 and 13 which, together with other components that will be described below, form an undercarriage for tray 11, end, rearwardly of the tray, in a pair of handle grips 14 for the user's hands. Because the wheel or wheels 22 are held in fixed vertical orientation relative to the handlebars, if the wheel or wheels tip to one side or the other, so too will the handlebars and the tray and vice versa.

Reference will now be made to FIGS. 2 to 6 in which like numerals have been used to identify like elements.

Figure 2:
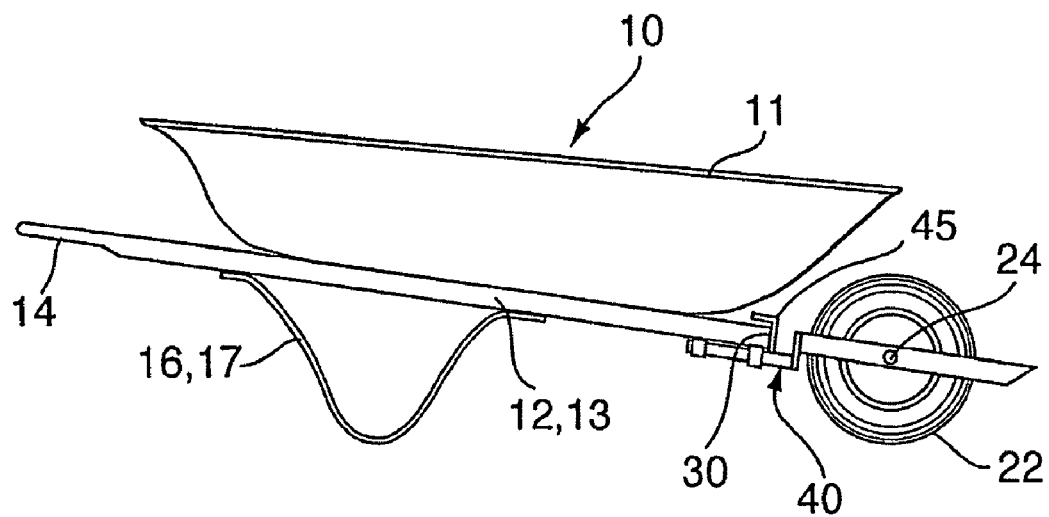
FIG. 2 is a side elevational schematical view of a modified wheelbarrow including a swivel mechanism for the wheels.

FIG. 2 schematically shows the present modification to a wheelbarrow 10 so that the tray and the wheels are pivotable relative to one another to provide an automatic load leveling capability to the wheelbarrow over uneven terrain. As modified, handlebars 12 and 13 are cut off at a point 30 forwardly of the tray and a swivel mechanism 40 which will be described in greater detail below is connected to the handlebars to extend forwardly therefrom. This allows the tray to remain substantially level while the wheels pivot or rotate about the wheelbarrow's longitudinal axis in response to irregularities in the ground. Excessive rotation of the wheels relative to the tray is prevented by a stop mechanism 45 that also will be described in greater detail below.

Figure 7:
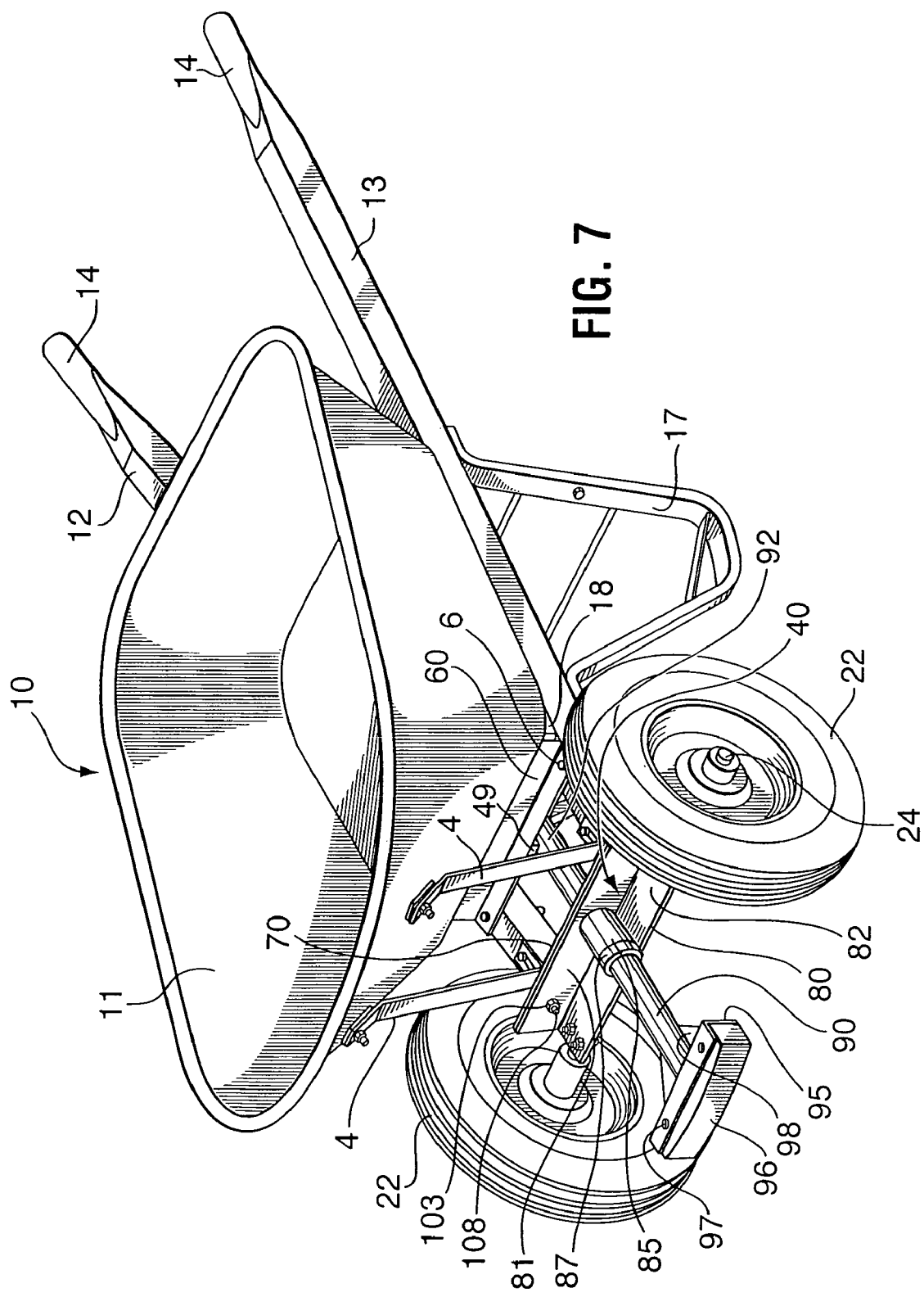
FIG. 7 is a front perspective view of a wheelbarrow having swivel means for the ground engaging wheels.
Figure 8:
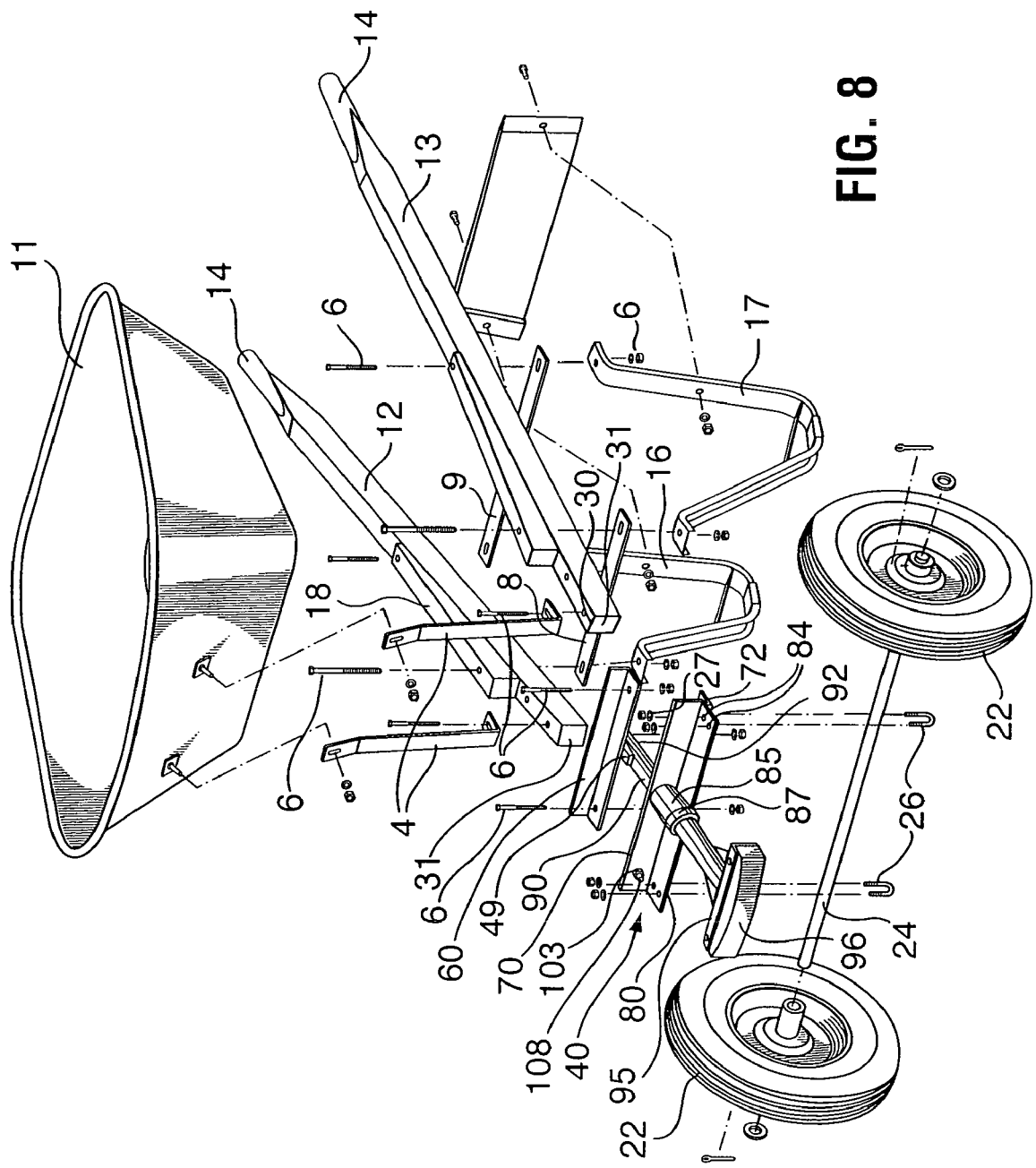
FIG. 8 is an exploded perspective view of the wheelbarrow of FIG. 7.

Reference will now be made to FIGS. 7 and 8 for a more detailed description of the modified wheelbarrow of the present invention. Again, like numerals have been used to identify like elements. The wheelbarrow generally includes tray 11, handlebars 12 and 13 including hand grips 14, ground engaging legs 16 and 17 which support the wheelbarrow when at rest, and wheels 22 rotatably connected to an axle 24. As shown most clearly in FIG. 8, handlebars 12 and 13 each include a wedge 18 for leveling the tray when the wheelbarrow is at rest. The tray, wedges, handlebars, legs and a pair of reinforcing spaced apart transversely extending stays 8 and 9 are connected together by means of fasteners such as nuts and bolts 6. Additional support for the tray is provided by means of a pair of spaced apart braces 4 respectively connected between the forward end of the tray and handlebars 12 and 13 as shown most clearly in FIG. 7. It will be understood that this construction as described so far is conventional and well known in the art.

To allow wheels 22 to pivot relative to the tray, the present wheelbarrow has been modified to include swivel mechanism 40. The mechanism can be sold as OEM equipment on new wheelbarrows, or it can be retrofitted to existing stock.

As will be seen in FIG. 8, handlebars 12 and 13 are shortened compared to conventional handlebars by being cut off at point 30 to expose end surfaces 31. To retrofit the swivel mechanism to an existing wheelbarrow, the existing handlebars can be cut or sawn off at this location and the swivel mechanism attached as will now be described.

Figure 9:
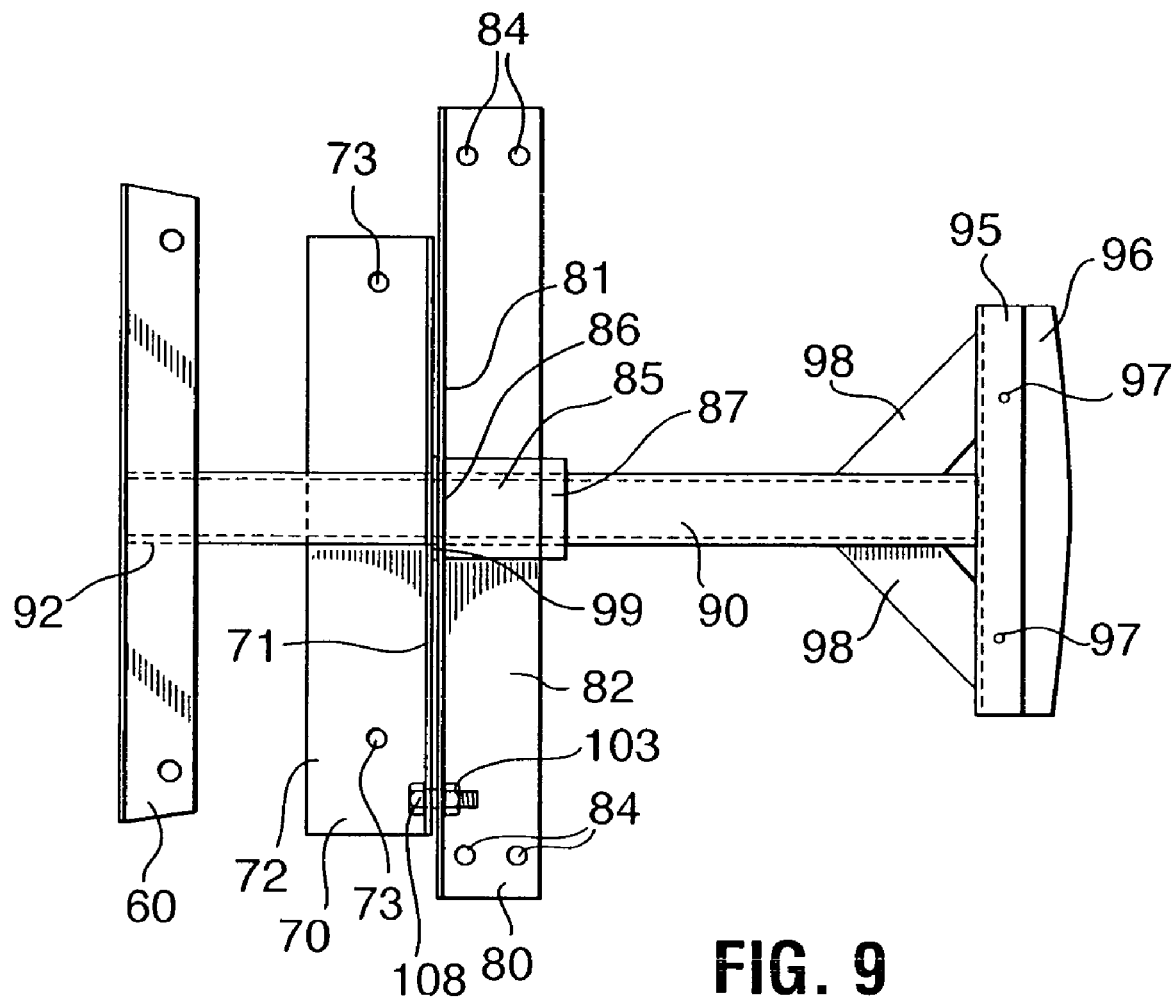
FIG. 9 is a plan view of the swivel mechanism forming part of the wheelbarrow of FIG. 7.
Figure 10:
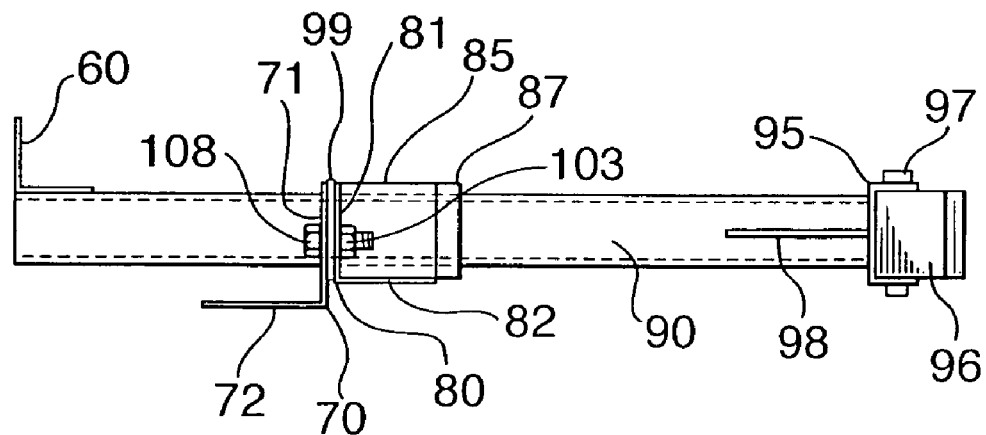
FIG. 10 is a side elevational view of the swivel mechanism of FIG. 9.
Figure 11:
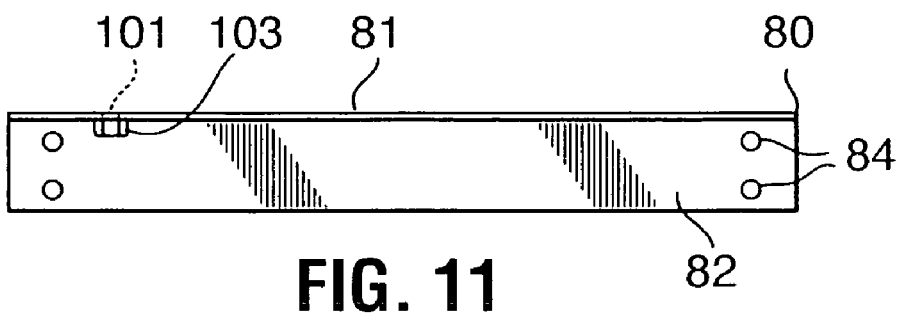
FIG. 11 is a plan view of an axle supporting member forming part of the swivel mechanism of FIG. 9.
Figure 12:
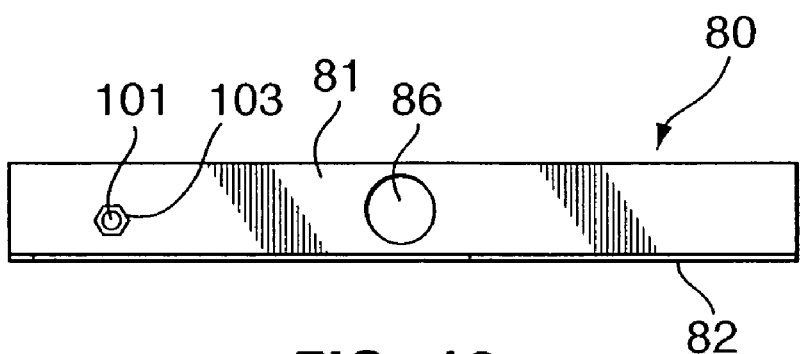
FIG. 12 is a front elevational view of the axle supporting member of FIG. 11.

With reference to FIG. 9, the swivel mechanism generally comprises a first cross member 60, a second cross member 70, an axle support member 80 and a longitudinally extending swivel bar 90.

Figure 13:
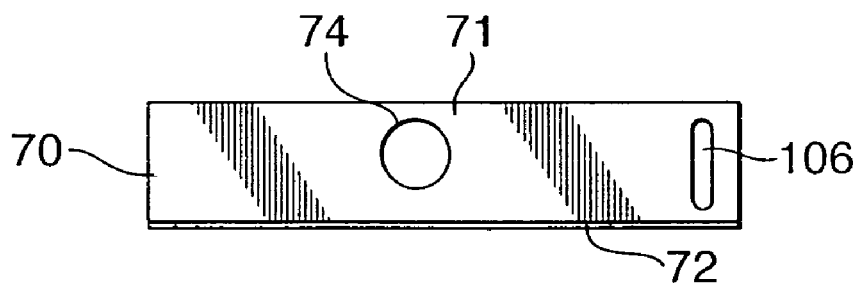
FIG. 13 is a plan view of a second cross member forming part of the swivel mechanism of FIG. 9.
Figure 14:
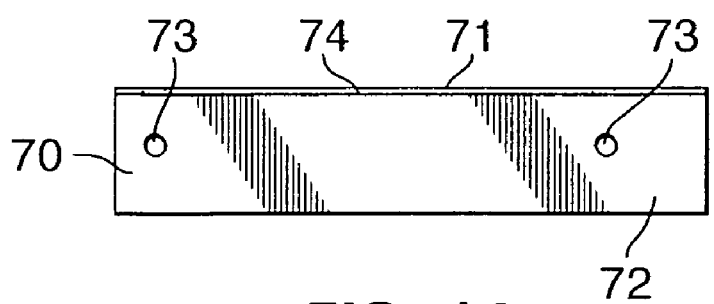
FIG. 14 is a front elevational view of the cross member of FIG. 13.

First cross member 60 is connected between the handlebars across their upper surfaces immediately in front of the tray using suitable fasteners such as nuts and bolts 6. Second cross member 70 is also connected between the handlebars so that the cross member's vertical flange 71 abuts against handlebar end surfaces 31 and its horizontal flange 72 abuts against the handlebars' lower surfaces. The connection of the second cross member to the handlebars is made using for example fasteners extending through holes 73 in horizontal flange 72 into the handlebars. As best seen in FIG. 13, a hole 74 is formed in vertical flange 71 which is large enough to accommodate swivel bar 90.

Like the second cross member, axle support member 80 can also be formed from a piece of angle iron having a vertical flange 81 and a horizontal flange 82. Axle 24 is connected to horizontal flange 82 by means of a pair of shackles 26 (FIG. 8) received into holes 84 in the horizontal flange and secured by means of nuts and washers 27. A tubular bushing or sleeve 85 is fixedly connected to vertical flange 81 such as by means of welding. Sleeve 85 is axially aligned with a hole 86 in the vertical flange. The internal diameters of the sleeve and hole 86 are large enough to allow the swivel bar to pass freely therethrough and to rotate relative to axle support 80.

Swivel bar 90 is inserted through sleeve 85, holes 86 and 74 and is then fixedly and non-rotatably connected at its inner end 92 to first cross member 60 as seen most clearly in FIG. 7. The connection can be by means of a weld or a connecting piece 49.

Axle support 80 is held in place relative to the second cross member 70 and swivel bar 90 by means of a stop bushing 87 positioned just ahead of sleeve 85. The stop bushing is fixedly connected to the swivel bar by means of a weld, set screw (not shown) or any other suitable strong connection.

A washer 99 that fits over the swivel bar and which is located between the second cross member 70 and axle support 80 spaces these two components slightly apart and facilitates relative rotation therebetween.

The outer end 96 of swivel bar 90 is fitted with a bumper bracket 95, a rubber bumper 96 secured to the bracket such as by means of screws 97 and some reinforcing braces 98 to add strength. As will be appreciated, the bumper is used to engage the ground when the wheelbarrow is tipped to discharge its load.

In operation, as the wheels traverse the ground, axle 24 and axle support member 80 will pivot around swivel bar 90 in response to irregularities in the ground while the tray will remains relatively stationary.

It is undesirable for axle 24 to pivot excessively so a limiting mechanism is preferably included on the swivel assembly. There are numerous means to accomplish this, but a simple mechanism is shown in the drawings, particularly FIGS. 11 to 14. Specifically, a hole 101 is formed in vertical flange 81 of axle support 80 and a threaded nut 103 is welded in place to be axially aligned over the hole.

An opposing slot 106 is formed in vertical flange 71 of second cross member 70. A bolt 108 (FIG. 8) is then passed through slot 106 and partially threaded into nut 103. The rotation of axle support 80 is thereby limited to the travel of bolt 108 in slot 106. At the rotational limits, additional torque arising from the terrain will be transferred to the handlebars.

Figure 15:
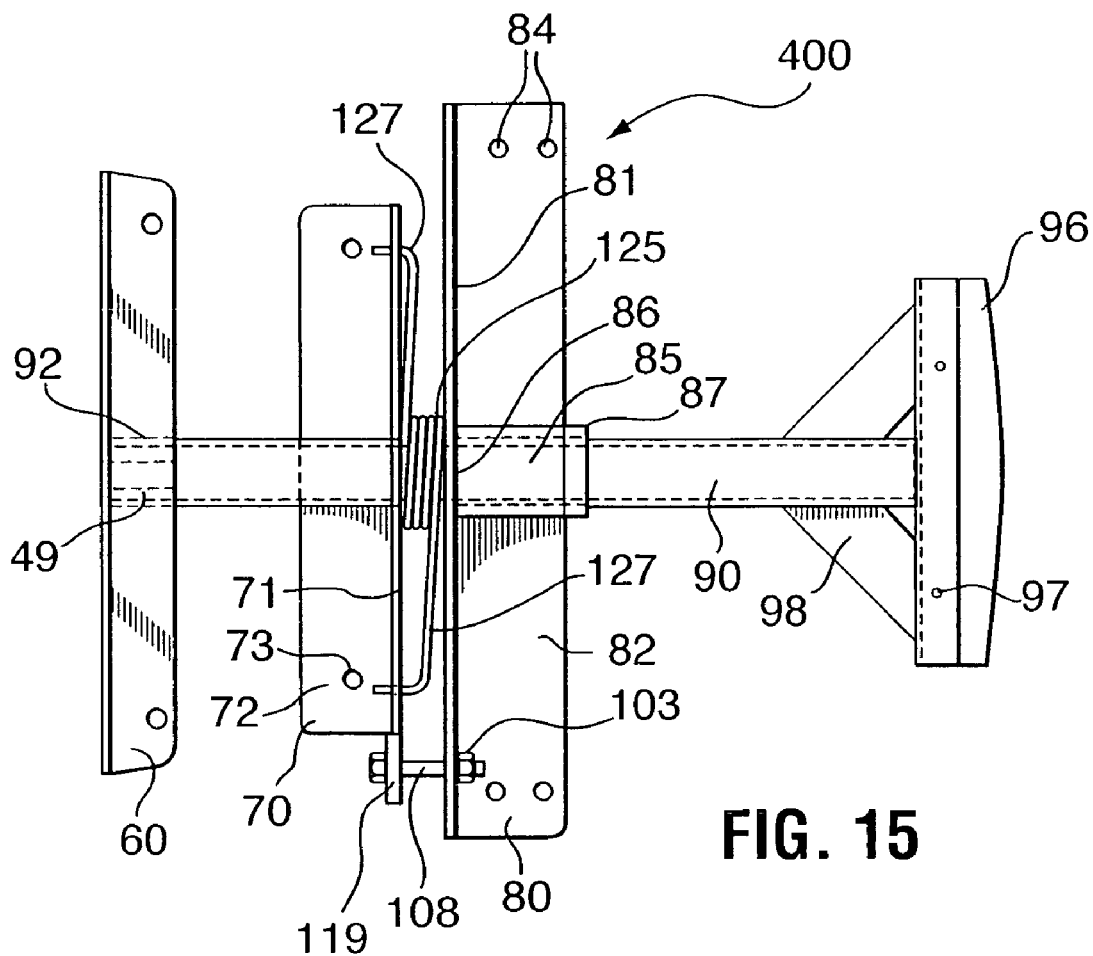
FIG. 15 is a plan view of a modified swivel mechanism forming part of the wheelbarrow of FIG. 7.
Figure 16:
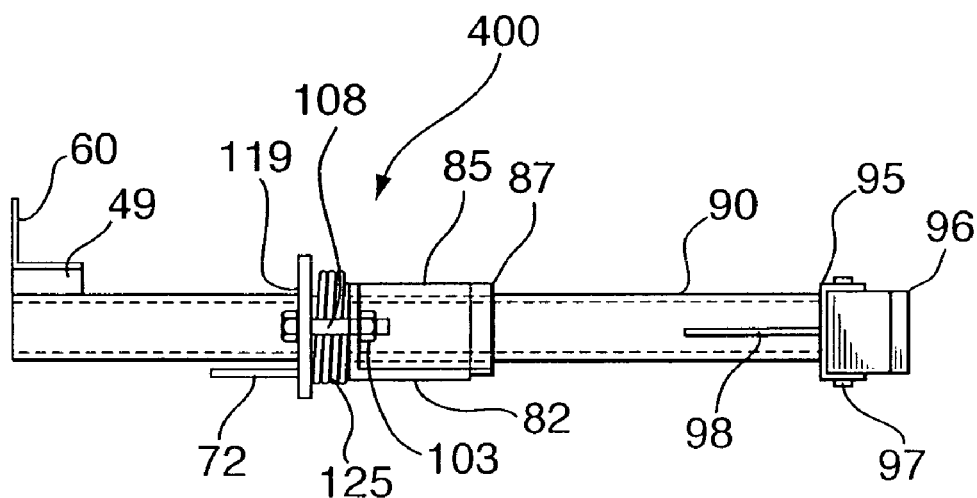
FIG. 16 is a side elevational view of the swivel mechanism of FIG. 15.

In another embodiment of the present wheelbarrow, the swivel mechanism can be modified to be self-centering so the wheels are normally biased into a non-pivoted position relative to the handlebars and to provide some resilient damping of its motion. Reference will now be made in this regard to FIGS. 15 and 16 showing a modified swivel mechanism 400 in which like elements are identified using like numerals.

As in the swivel mechanism shown in FIG. 9, the basic components of the mechanism include a first cross member 60, a second cross member 70, an axle support member 80 and a longitudinally extending swivel bar 90. The function and installation of these components is substantially the same as described above with respect to swivel mechanism 40.

However, rather than a simple washer 99 between members 70 and 80, a coil spring 125 is disposed between the two. The spring functions to self center axle support 80 relative to second cross member 70 and preferably to absorb and dampen some of the energy imparted to axle support 80 as wheels 22 traverse uneven ground.

Spring 125 is non-rotatably mounted relative to axle support 80. This can be accomplished in a number of ways as will be apparent to those skilled in the art. One means of connection is to elongate sleeve 85 so that it extends through hole 86 in vertical flange 81 of the axle support, hole 86 being enlarged sufficiently for this purpose. The part of the sleeve extending through hole 86 and which is then positioned between support 80 and cross member 70 becomes a spindle over which the spring is concentrically mounted. The spring and the sleeve are non-rotatably connected together such as by means of a weld, spline or any other torque resistant means.

Spring 125 includes radially extending arms 127 bent at their outer ends to pass through correspondingly sized holes formed in vertical flange 71 of second cross member 70.

In a neutral position, spring 125 maintains support 80 and second cross member 70 in parallel coplanar alignment so that wheels 22 are non-pivoted relative to the handlebars and tray of the wheelbarrow. As wheels 22 traverse irregularities in the ground, causing axle support 80 to pivot relative to second cross member 70, the spring damps this motion to reduce shock and vibration. As the irregularity is passed by, the spring applies a restorative force for self-centering members 70 and 80. This same self-centering is also useful if the wheelbarrow is lifted above the ground or suspended for storage as it prevents the wheels from flopping to one side or the other.

As will be apparent to those skilled in the art, spring 125 is only one means of providing resiliency and self-centering to swivel mechanism 400 and the use of other means is contemplated, including for example a torsional rubber adhered or connected to each of axle support 80 and cross member 70, and other similar mechanisms.

This embodiment also includes a limiting mechanism to prevent excessive rotation of axle 24 relative to second cross member 70. The mechanism is the same as that described above with reference to FIGS. 11 to 14 except that slot 106 is formed in an extension piece 119 permanently connected such as by welding to the end of cross member 70.

The above-described embodiments of the present invention are meant to be illustrative of preferred embodiments and are not intended to limit the scope of the present invention. Various modifications, which would be readily apparent to one skilled in the art, are intended to be within the scope of the present invention. The only limitations to the scope of the present invention are set forth in the following claims appended hereto.

The embodiments of the invention in which an exclusive property or privilege is claimed are defined as follows:

1. A wheelbarrow comprising:
   a tray for carrying a load;
   a pair of coplanar handlebars connected to the tray to support the same;
   a pair of spaced apart ground engaging wheels rotatably mounted on axle means; and
   swivel means connecting said pair of spaced apart wheels to said handlebars, said swivel means comprising an axle support member for rigid connection to said axle means and a swivel bar non-rotatably connected to said wheelbarrow to extend forwardly from said handlebars, said axle support member being rotatably mounted on said swivel bar and extending transversely relative thereto, whereby said axle means, said wheels connected to the axle means and said axle support member are pivotable about said swivel bar, said handlebars remaining substantially level as said wheels pivot.

2. The wheelbarrow of claim 1, wherein said axle support member includes an orthogonally extending tubular sleeve fixedly connected thereto, said swivel bar extending concentrically through said sleeve to facilitate rotation of said axle support member relative to said swivel bar.

3. The wheelbarrow of claim 2, wherein said swivel bar has an inner end and an outer end, said axle support member being positioned on said swivel bar at a point intermediate said inner and outer ends.

4. The wheelbarrow of claim 3, wherein said inner end of said swivel bar is non-rotatably connected to a first cross member extending between said pair of handlebars.

5. The wheelbarrow of claim 3, wherein said outer end of said swivel bar includes a ground engaging bumper to facilitate tipping of said wheelbarrow to discharge its load.

6. The wheelbarrow of claim 4, wherein said swivel means further include a second cross member connected between said handlebars at their forwardmost ends, said second cross member having a hole formed therein for the swivel bar to pass through, said hole being axially aligned with said tubular sleeve on said axle support member.

7. The wheelbarrow of claim 6, including a stop member fixedly connectable to said swivel bar to retain said axle support member on said swivel bar at a position between said stop member and said second cross member.

8. The wheelbarrow of claim 7, wherein said stop member is a sleeve for receiving said swivel bar concentrically therethrough.

9. The wheelbarrow of claim 7, including means to limit the rotation of said axle support member relative to said handlebars.

10. The wheelbarrow of claim 9, wherein said means to limit rotation comprise:
    a vertical slot having an upper end and a lower end formed in one of said axle support member or said second cross member;
    a threaded aperture in the other of said axle support member or said second cross member, said threaded aperture being formed in axial alignment with said vertical slot; and
    a pin member inserted through said slot for connection to said threaded aperture, whereby contact between said pin member and said upper and lower ends of said slot limit the rotation of said axle support member relative to said handlebars.

11. The wheelbarrow of claim 10, including a washer concentrically mounted over said swivel bar and positioned between said second cross member and said axle support member to space the two apart and to facilitate rotation therebetween.

12. The wheelbarrow of claim 6 including means for normally biasing said wheels into a non-pivoted position relative to said handlebars.

13. The wheelbarrow of claim 12 wherein said resilient means comprise a spring member resiliently interconnecting said axle support member and said swivel bar.

14. The wheelbarrow of claim 13 wherein said spring member is connected between said tubular sleeve and said second cross member, the connection between said spring and said tubular sleeve being non-rotatable so that said spring exerts a resilient centering force between said second cross member and said axle support member.

15. A wheelbarrow comprising:
    a tray for carrying a load;
    a pair of coplanar handlebars connected to the tray to support the same;

a pair of spaced apart ground engaging wheels rotatably mounted on axle means;

swivel means connecting said pair of spaced apart wheels to said handlebars, said swivel means comprising an axle support member for rigid connection to said axle means and a swivel bar non-rotatably connected to said wheelbarrow to extend forwardly from said handlebars, said axle support member being rotatably mounted on said swivel bar and extending transversely relative thereto, whereby said axle means, said wheels connected to the axle means and said axle support member are pivotable about said swivel bar, said handlebars remaining substantially level as said wheels pivot and means for normally biasing said wheels into a non-pivoted position relative to said handlebars.

16. The wheelbarrow of claim 15, wherein an outer end of said swivel bar includes a ground engaging bumper to facilitate tipping of said wheelbarrow to discharge its load.

17. The wheelbarrow of claim 15, including means to limit the rotation of said axle support member relative to said handlebars.

18. The wheelbarrow of claim 17, wherein said means to limit rotation comprise:
   a vertical slot having an upper end and a lower end formed in one of said axle support member or said second cross member;
   a threaded aperture in the other of said axle support member or said second cross member, said threaded aperture being formed in axial alignment with said vertical slot; and
   a pin member inserted through said slot for connection to said threaded aperture, whereby contact between said pin member and said upper and lower ends of said slot limit the rotation of said axle support member relative to said handlebars.

19. The wheelbarrow of claim 15, wherein said axle support member includes an orthogonally extending tubular sleeve fixedly connected thereto, said swivel bar extending concentrically through said sleeve to facilitate rotation of said axle support member relative to said swivel bar.

20. The wheelbarrow of claim 19, wherein said swivel bar has an inner end and an outer end, said axle support member being positioned on said swivel bar at a point intermediate said inner and outer ends.

21. The wheelbarrow of claim 20, wherein said inner end of said swivel bar is non-rotatably connected to a first cross member extending between said pair of handlebars.

22. The wheelbarrow of claim 21, wherein said swivel means further include a second cross member connected between said handlebars at their forwardmost ends, said second cross member having a hole formed therein for the swivel bar to pass through, said hole being axially aligned with said tubular sleeve on said axle support member.

23. The wheelbarrow of claim 22 wherein said resilient means comprise a spring member resiliently interconnecting said axle support member and said swivel bar.

24. The wheelbarrow of claim 23 wherein said spring member is connected between said tubular sleeve and said second cross member, the connection between said spring and said tubular sleeve being non-rotatable so that said spring exerts a resilient centering force between said second cross member and said axle support member.

25. The wheelbarrow of claim 24, including a stop member fixedly connectable to said swivel bar to retain said axle support member on said swivel bar at a position between said stop member and said second cross member.

26. The wheelbarrow of claim 25, wherein said stop member is a sleeve for receiving said swivel bar concentrically therethrough.

* * * * *